Nov. 23, 1965  H. J. KAZIENKO  3,219,354
PIPE JOINT

Filed March 28, 1962  2 Sheets-Sheet 1

INVENTOR.
HENRY J. KAZIENKO
BY
*John A. McKinney*
ATTORNEY

Nov. 23, 1965 H. J. KAZIENKO 3,219,354
PIPE JOINT
Filed March 28, 1962 2 Sheets-Sheet 2

INVENTOR.
HENRY J. KAZIENKO
BY
ATTORNEY

United States Patent Office 3,219,354
Patented Nov. 23, 1965

3,219,354
PIPE JOINT
Henry J. Kazienko, New Brunswick, N.J., assignor to Johns-Manville Corporation, New York, N.Y., a corporation of New York
Filed Mar. 28, 1962, Ser. No. 183,119
3 Claims. (Cl. 277—168)

The instant invention relates to pipe joints and their assembly. While the invention has utility with many types of pipe, for example, steel or iron pipe, it is particularly adapted for use in connecting pipe sections composed of a hardened, compressed, fibro-cement composition, and more particularly, where a completely nonmetallic coupling comprising sections of asbestos-cement pipe is desired. The joint disclosed in the instant invention is particularly suitable for joining sections of asbestos-cement sewer pipe.

At the present time, one form of asbestos-cement sewer pipe utilizes the types of coupling which are fully explained in the U.S. patent to Heisler, Patent No. 2,738,- 992 issued March 20, 1956. One of the problems occurring in the field installation of the types of couplings described in the Heisler patent is that portions of the resilient gaskets are sometimes displaced or distorted as the coupling is assembled. This difficulty is principally caused either by improper lubrication of the pipe end or by the accidental dislodging of dirt from adjacent surroundings, which dirt falls on the exposed pipe end prior to its installation. Thus, when the pipe end contacts the resilient gasket in those areas of improper lubrication or excessive dirt, extremely high frictional characteristics are developed so that in some instances part of the resilient gasket moves with the pipe end and is either displaced from the groove in the coupling or develops an undesirable twist therein. This is particularly undesirable in joining sections of asbestos-cement sewer pipe because of the health hazards and because of the tendency to encourage and permit root penetration into the sewer line.

It is an object of this invention to provide a resilient gasket for cooperation with the components of a pipe joint which, even under extremely adverse conditions, will not be readily displaced or distorted from its proper position or orientation during assembly of the joint.

It is a further object of the instant invention to provide a pipe joint comprising a pipe end, a gasket, and a coupling so as to insure proper seating of the resilient gasket and to minimize the required assembly forces.

The foregoing objects are accomplished in accordance with the instant invention by a resilient gasket having a cross sectional shape which cooperates with the components of the pipe joints in a unique manner to prevent the displacement or distortion of the resilient gasket during the formation of the joint wherein, in the preferred embodiment, the resilient gasket seats in a groove in the coupling and is compressed between the coupling and the pipe end. The resilient gasket is generally annular having a substantially symmetrical cross sectional configuration in an axial direction with, in the preferred embodiment, axially spaced protrusions extending generally in a radial direction in contact with an inner peripheral surface of the groove in the coupling. The outer peripheral surface of the resilient gasket between the spaced protrusions is formed to define a circumferentially and axially extending cavity in the outer peripheral surface of the gasket. The inner peripheral surface of the gasket has a continuous protuberance extending generally in a radial direction and located in an axial direction generally centrally of the gasket and disposed for contact by the pipe end. The resilient gasket is so designed that when the pipe end is inserted into the coupling and contacts the protuberance thereon, the resilient gasket is pressed against the inner peripheral surface of the coupling and is deformed so as to fill the cavity between the spaced axial protrusions of the resilient gasket. The application of the compressive forces on the protuberance of the resilient gasket is distributed through the spaced axial protrusions and this together with the provision of the cavity into which portions of the resilient gasket may deform minimizes the tendency of the resilient gasket to be displaced from the groove or otherwise distorted therein. Also, the location of cavity into which the gasket may deform allows the coupling to be assembled with a minimum amount of assembly forces.

The invention will be more fully understood and further objects and advantages thereof will become apparent when reference is made to the following detailed description of a preferred embodiment of the invention and the accompanying drawings in which.

Figure 4:
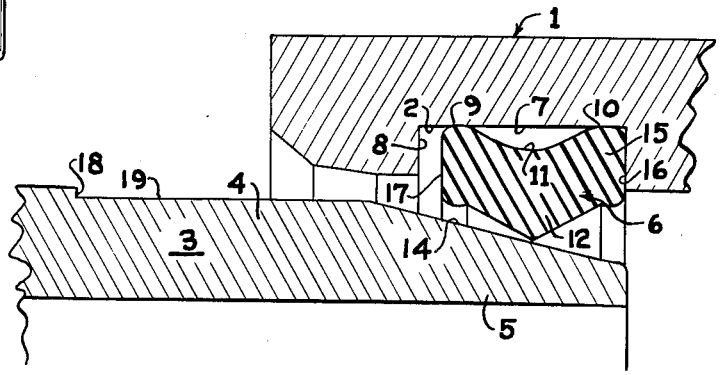
FIG. 4 is a view in cross section of a portion of a joint, split axially thereof, and illustrating the initial contact between the pipe end and the resilient gasket.

Referring to the drawings there is disclosed in FIG. 4 a portion of a coupling 1 having a generally cylindrical body and an annular groove 2 formed radially outwardly from the inner circumference of the coupling. The coupling 1 is adapted to receive the pipe end 3 having a section 4 of a substantially cylindrical outer circumference or periphery and a portion 5 adjacent the end of the pipe which is tapered on its outer periphery at an angle of, for example 10° to 15° with respect to the axis of the portion. The outer diameters of the end portion of the pipe received within the coupling 1 are sufficiently smaller than the inner diameter of the coupling 1 that clearance is provided for axial movement and for limited canting of the pipe end and coupling relative to each other.

In FIGS. 1–4, inclusive, there is illustrated an annular resilient readily deformable gasket 6 of rubber, synthetic rubber, or any suitable resilient and readily deformable plastic material disposed in the groove 2. The initial thickness of the gasket, in its relaxed or undeformed state, in a generally radial direction is greater than the distance between the radially outer wall 7 of the groove 2 and the radially opposite portion of the outer periphery of the pipe end, so that upon assembly the gasket is flattened in a radial direction. The axial width of the groove in the coupling 1 is greater than the axial width of the gasket 6. In FIG. 4, one axial end wall 8 is illustrated as extending substantially perpendicular to the axis of the coupling 1. However, it is understood that this is for illustration purposes only and is not intended to limit the invention in any manner. In the final assembled position of the joint in the embodiment illustrated in FIG. 5, the radially outer wall 7 is radially opposite the cylindrical section 4 of the pipe end 3.

Figure 3:
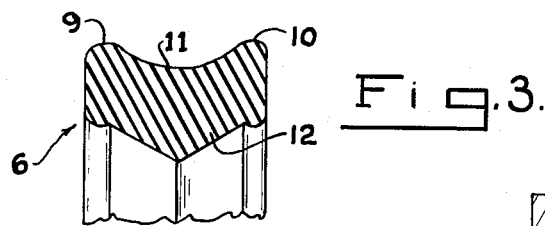
FIG. 3 is an enlarged cross-sectional view of the resilient gasket.

As illustrated particularly in FIGS. 3 and 4, the annular resilient gasket 6 is substantially symmetrical in axial cross section. In its relaxed state, the outer peripheral surface of the resilient gasket 6 comprises two protrusions 9 and 10 extending generally in a radial direction and being substantially continuous circumferentially of the gasket. The outer peripheral surface of the resilient gasket is so shaped to provide a circumferentially extending cavity 11 between the radially extending protrusions 9 and 10. The inner peripheral surface of the resilient gasket 6 comprises a substantially continuous protuberance 12 extending inwardly in a generally radial direction and located in an axial direction generally centrally of the resilient gasket 6. The protuberance 12 is generally radially opposite the cavity 11 for a purpose to be described.

Figure 5:
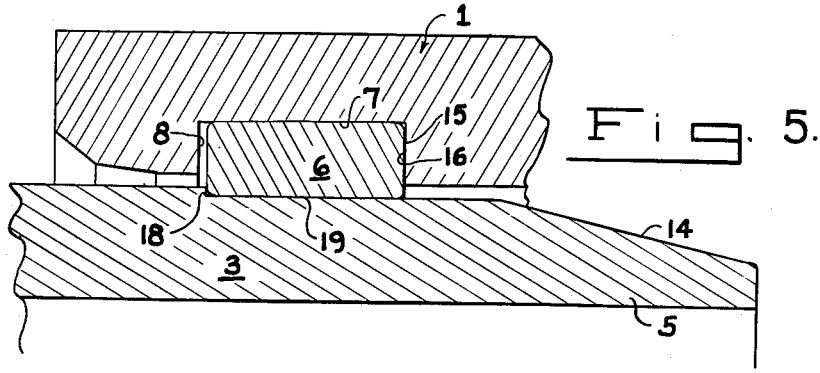
FIG. 5 is a view in cross section of a portion of an assembled joint, split axially thereof.

The features and mode of operation of the preferred embodiment of the instant invention are illustrated in FIG. 4 which discloses the instant during the assembly of a pipe joint wherein the outer circumference 14 of the tapered portion 5 of the pipe end 3 comes into contact with the protuberance 12. As the pipe end 3 is continued to be inserted into the coupling 1, increased compressive forces are asserted on the resilient gasket 6 due to the decreasing distance between the peripheral surface 7 of the groove 2 and the circumference 14 of the tapering portion 5. These compressive forces are distributed through the resilient gasket 6 to the protrusions 9 and 10. Because of this distribution of the compressive forces, the tendency of the annular resilient gasket to turn in the groove is minimized. Also, as the pipe end 3 continues to be inserted into the coupling 1, the compressive forces act on the protuberance 12 so as to deform the annular resilient gasket 6 so that the cavity 11 is gradually filled. This novel characteristic of the instant invention allows for a minimum of assembly effort during the formation of the joint and also cooperates with the distribution of the compressive forces to minimize the tendency of the resilient gasket 6 to be displaced from the groove 2. As illustrated in FIG. 5, the pipe end 3 is inserted into the coupling 1 until the leading edge 15 of the resilient gasket 6 contacts the wall 16 of the groove 2 and the trailing edge 17 of the resilient gasket 6 contacts the shoulder 18 on the pipe end. The axial end wall 8 cooperates with the shoulder 18 on the pipe end in preventing gasket blow out due to internal pressures. It is noted that in the position illustrated in FIG. 5, the annular resilient gasket 6 has assumed a substantially rectangular configuration in axial cross section and is positioned between the inner peripheral surface 7 of the groove 2 and the annular surface 19 of section 4 of the pipe end 3.

Another physical characteristic of the gasket that must be considered in a joint of this nature is the ratio of the longitudinal axial length of the gasket to its radial thickness. If the gasket length is decreased considerably, a tumbling or twisting in the groove will develop under adverse conditions as described above. Therefore, it is considered essential and necessary that the minimum axial length of the gasket be greater than the maximum radial thickness thereof, wherein the axial length is measured along a center line from the leading edge 15 of the gasket to the trailing edge 17. The above ratio of gasket axial length to radial thickness should be greater than 1.2:1 and in the preferred form of the invention, the ratio is 1.6:1. Sufficient clearance must be allowed axially in the groove of the coupling to permit the easy and natural axial expansion of the resilient gasket when it is compressed between the pipe end and the coupling. If the resilient gasket could not expand in the groove, then the assembly effort would be so great that it would not be possible to complete the joint.

Figure 1:
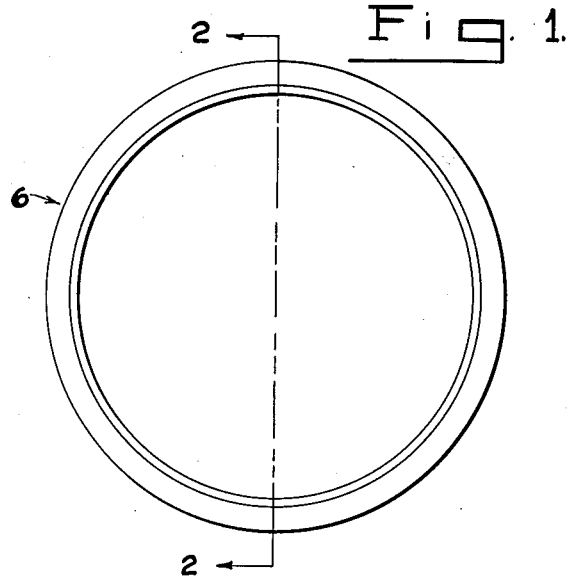
FIG. 1 is a view in end elevation of a resilient gasket made in accordance with the instant invention.
Figure 2:
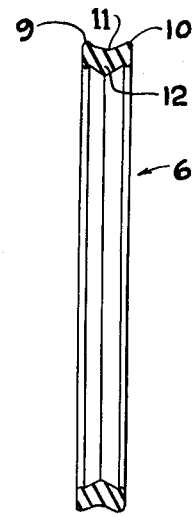
FIG. 2 is a view in cross section taken along the plane passing through the line 2—2 of FIG. 1.
Figure 6:
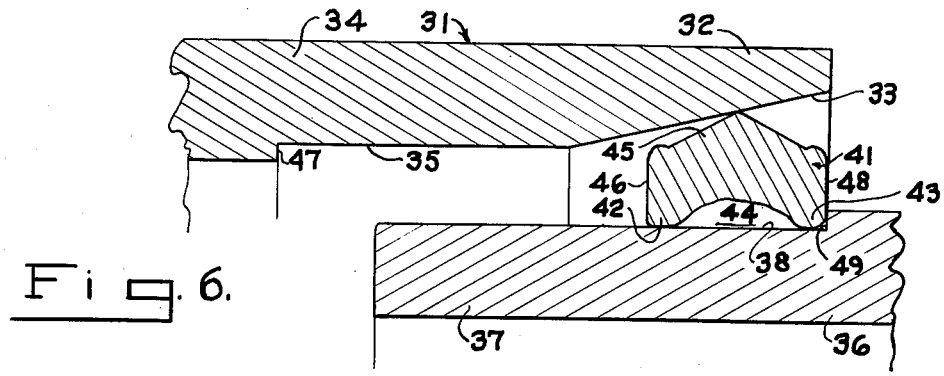
FIG. 6 is a view in cross section of a portion of another form of joint split axially thereof and illustrating the initial contact between the coupling and the resilient gasket.
Figure 7:
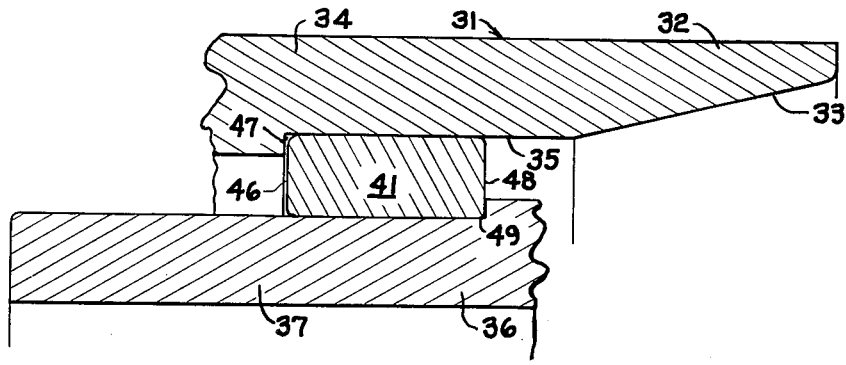
FIG. 7 is a view in cross section of a portion of the joint, as illustrated in FIG. 6, in final assembly.

Although the desired form of the invention is illustrated in FIGS. 4 and 5 because of the methods utilized in the manufacture of asbestos-cement products, it is within the scope of the instant invention to provide for an arrangement between pipe and coupling such as that illustrated in FIGS. 6 and 7 wherein the relative contours of the resilient gasket 6 have been reversed. Thus, as illustrated in FIG. 6, the coupling 31 has a leading portion 32 having an inner circumference 33 tapered at an angle of, for example, 10° to 15°, with respect to the axis of the coupling 31 and a portion 34 having an inner circumference 35 that is substantially cylindrical in nature. The pipe end 36 has a portion 37 having a substantially cylindrical peripheral surface 38. If desired, the leading portion of the pipe end 37 may have a tapered circumference such as illustrated in FIG. 1.

The annular resilient gasket 41, similar in all operational characteristics to annular resilient gasket 6, having axially spaced protrusions 42 and 43 extending inwardly in a generally radial direction is positioned on the peripheral surface 38 of the pipe end 36 with the protrusions 42 and 43 in contact with the peripheral surface 38. The inner peripheral surface of the resilient gasket 41 is so shaped so as to form a cavity 44 between the axially spaced protrusions 42 and 43. The outer peripheral surface of the resilient gasket 41 is provided with a protuberance 45 extending outwardly in a generally radial direction and located in an axial direction generally centrally of the resilient gasket 41. The protuberance 45 is generally radially opposite the cavity 44. The cooperation between the various elements in the pipe joint illustrated in FIGS. 6 and 7 is substantially the same as that described above relative to FIGS. 4 and 5. As illustrated in FIG. 7, the resilient gasket 41 assumes a generally rectangular axial cross section configuration in its fully assembled position with a portion of its leading edge 46 against a shoulder 47 on the coupling 31 and a portion of its trailing edge 48 against a shoulder 49 on the pipe end.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. A pipe joint comprising:
 (a) male and female components for said pipe joint,
 (b) said male component having a section with a uniform generally cylindrical outer surface and a tapered section having a progressively smaller diameter adjacent an end thereof so that the smallest outside diameter of said male component is closest adjacent said end,
 (c) an annular shoulder formed on said uniform generally cylindrical section and axially spaced inwardly from said tapered section,
 (d) said female component having a generally cylindrical inner circumference, portions of the surface of which are arranged in the form of a groove having wall portions constituting a radially outer wall portion generally radially opposite said generally cylindrical section, an outer end wall portion and an inner end wall portion,
 (e) an annular resilient readily deformable gasket in said groove having a leading section facing said outer end wall portion and abutting against said shoulder,
 (f) said resilient gasket in its relaxed form having a symmetrical axial cross-sectional configuration comprising,
 (g) at least a pair of spaced protrusions on one of the peripheral surfaces of said resilient gasket,
 (h) each of said spaced protrusions extending generally in a radial direction and terminating adjacent the surface of said radially outer wall portion of said groove,
 (i) means defining a cavity between said spaced protrusions and said peripheral surface,
 (j) a protuberance on the other peripheral surface of said resilient gasket,
 (k) said protuberance extending generally in a radial direction,

(l) said protuberance lying generally radially opposite said cavity, (m) said protuberance being contacted by said tapered section of said male component during the completion of said joint to apply compressive forces in increasing amounts on said resilient gasket, said forces acting on said gasket being distributed so that the tendency of said gasket to be distorted in said groove or to be displaced in said groove is substantially eliminated, and (n) said resilient gasket deforming under the action of said compressive forces into a solid mass having a substantially rectangular configuration in axial cross-section with said gasket cooperating with said shoulder and said inner end wall portion to position said male component relative to said female component and with said shoulder and said outer end wall portion to provide resistance against blowout.

2. A pipe joint as in claim 1 and further comprising:
(a) said resilient gasket in its relaxed state having a ratio of minimum axial length to maximum radial thickness of at least about 1.2:1.

3. A pipe joint comprising:
(a) male and female components for said pipe joint,
(b) said male component having a section with a uniform generally cylindrical outer surface and a tapered section having a progressively smaller diameter adjacent an end thereof so that the smallest outside diameter of said male component is closest adjacent said end,
(c) said female component having a generally cylindrical inner circumference, portions of the surface of which are arranged in the form of a groove having wall portions constituting a radially outer wall portion generally radially opposite said generally cylindrical section, an outer end wall portion and an inner end wall portion,
(d) means cooperating with said male and female components for positioning said male component relative to said female component,
(e) an annular resilient deformable gasket in said groove having a leading section facing said outer end wall portion,
(f) said resilient gasket in its relaxed form having a symmetrical axial cross-sectional configuration comprising, (g) at least a pair of spaced protrusions on one of the peripheral surface of said resilient gasket,
(h) each of said spaced protrusions extending generally in a radial direction and terminating adjacent the surface of said radially outer wall portion of said groove,
(i) means defining a cavity between said spaced protrusions and said peripheral surface,
(j) a protuberance on the other peripheral surface of said resilient gasket,
(k) said protuberance extending generally in a radial direction,
(l) said protuberance lying generally radially opposite said cavity,
(m) said protuberance being contacted by said tapered section of said male component during the completion of said joint to apply compressive forces in increasing amounts on said resilient gasket, said forces acting on said gasket being distributed so that the tendency of said gasket to be distorted in said groove or to be displaced in said groove is substantially eliminated, and
(n) said resilient gasket deforming under the action of said compressive forces into a solid mass having a substantially rectangular configuration in axial cross-section with said gasket cooperating with said outer end wall portion to provide resistance against blowout.

References Cited by the Examiner
UNITED STATES PATENTS

| | | | |
|---|---|---|---|
| 2,477,533 | 7/1949 | Whiting | 277—170 |
| 2,770,510 | 11/1956 | Collins | 277—178 XR |
| 2,892,644 | 6/1959 | Collins | 277—171 |
| 3,028,165 | 4/1962 | Collins | 277—206 |
| 3,048,415 | 8/1962 | Shook | 285—170 |

FOREIGN PATENTS 853,655   11/1960   Great Britain.

LEWIS J. LENNY, *Primary Examiner.*
SAMUEL ROTHBERG, EDWARD V. BENHAM,
*Examiners.*